US007324935B2

(12) United States Patent
Lee

(10) Patent No.: US 7,324,935 B2
(45) Date of Patent: Jan. 29, 2008

(54) METHOD FOR SPEECH-BASED INFORMATION RETRIEVAL IN MANDARIN CHINESE

(76) Inventor: Lin-Shan Lee, 3F, No. 7, Lane 58, Wen-Chou Street, Taipei (TW)

( * ) Notice: Subject to any disclaimer, the term of this patent is extended or adjusted under 35 U.S.C. 154(b) by 1050 days.

(21) Appl. No.: 10/612,730

(22) Filed: Jul. 1, 2003

(65) Prior Publication Data
US 2004/0215465 A1   Oct. 28, 2004

(30) Foreign Application Priority Data
Mar. 28, 2003   (TW) .............................. 92107121 A

(51) Int. Cl.
*G06F 17/20*   (2006.01)
(52) U.S. Cl. ........................................................ 704/8
(58) Field of Classification Search ................. None
See application file for complete search history.

(56) References Cited

OTHER PUBLICATIONS

Lin-Shan Lee, Bo-Ren Bai, and Lee-Feng Chien "Syllable-Based Relevance Feedback Techniques for Mandarin Voice Record Retrieval Using Speech Queries", IEEE ICASSP 1997, vol. 2, p. 1459-1462.*

Lee-Feng Chien, Hsin-Min Wang, Bo-Ren Bai, and Sun-Chien Lin "A Spoken Access Approach for Chinese Text and Speech Information Retrieval", J. Am. Soc. for Information Science, vol. 51, No. 4, p. 313-323, Feb. 11, 2000.*
Berlin Chen, Hsin-Min Wang, and Lin-Shan Lee. "Discriminating Capabilities of Syllable-Based Features and Approaches of Utilizing Them for Voice Retrieval of Speech Information in Mandarin Chinese," IEEE Trans. Speech and Audio Processing, vol. 10, No. 5, Jul. 2002.*
John H. L. Hansen, et al. "SpeechFind: Advances in Spoken Document Retrieval for a National Gallery of the Spoken Word", IEEE Trans. Speech and Audio Processing, vol. 13, No. 5, Sep. 2005.*

* cited by examiner

*Primary Examiner*—Tālivaldis Ivars Šmits
(74) *Attorney, Agent, or Firm*—Christensen O'Connor Johnson Kindness PLLC

(57) ABSTRACT

The present invention is directed to a method for speech-based information retrieval in Mandarin Chinese, considering a monosyllabic structure of the Chinese language, and a whole class of syllable-based indexing terms, including overlapping segments of syllables and syllable pairs separated by a few syllables. The strong discriminating capabilities of such syllable-based indexing terms have been verified. Special approaches for better utilizing such capabilities, including fusion with the word- and character-level information and improved approaches to obtain better syllable-based features and query expressions and so on, are disclosed too.

48 Claims, 2 Drawing Sheets

| Overlapping Syllable Segments with Length N | Examples |
|---|---|
| S(N), N=1 | $(s_1)(s_2)...(s_{10})$ |
| S(N), N=2 | $(s_1\ s_2)(s_2\ s_3)...(s_9\ s_{10})$ |
| S(N), N=3 | $(s_1\ s_2\ s_3)(s_2\ s_3\ s_4)...(s_8\ s_9\ s_{10})$ |
| S(N), N=4 | $(s_1\ s_2\ s_3\ s_4)(s_2\ s_3\ s_4\ s_5)...(s_7\ s_8\ s_9\ s_{10})$ |
| S(N), N=5 | $(s_1\ s_2\ s_3\ s_4\ s_5)(s_2\ s_3\ s_4\ s_5\ s_6)...(s_6\ s_7\ s_8\ s_9\ s_{10})$ |
| Syllable Pair Separated by $n$ Syllables | Examples |
| $P_s(n)$, n=1 | $(s_1\ s_3)(s_2\ s_4)...(s_8\ s_{10})$ |
| $P_s(n)$, n=2 | $(s_1\ s_4)(s_2\ s_5)...(s_7\ s_{10})$ |
| $P_s(n)$, n=3 | $(s_1\ s_5)(s_2\ s_6)...(s_6\ s_{10})$ |
| $P_s(n)$, n=4 | $(s_1\ s_6)(s_2\ s_7)...(s_5\ s_{10})$ |

| Overlapping Syllable Segments with Length N | Examples |
|---|---|
| $S(N)$, $N=1$ | $(s_1)(s_2)\ldots(s_{10})$ |
| $S(N)$, $N=2$ | $(s_1\ s_2)(s_2\ s_3)\ldots(s_9\ s_{10})$ |
| $S(N)$, $N=3$ | $(s_1\ s_2\ s_3)(s_2\ s_3\ s_4)\ldots(s_8\ s_9\ s_{10})$ |
| $S(N)$, $N=4$ | $(s_1\ s_2\ s_3\ s_4)(s_2\ s_3\ s_4\ s_5)\ldots(s_7\ s_8\ s_9\ s_{10})$ |
| $S(N)$, $N=5$ | $(s_1\ s_2\ s_3\ s_4\ s_5)(s_2\ s_3\ s_4\ s_5\ s_6)\ldots(s_6\ s_7\ s_8\ s_9\ s_{10})$ |
| Syllable Pair Separated by $n$ Syllables | Examples |
| $P_s(n)$, $n=1$ | $(s_1\ s_3)(s_2\ s_4)\ldots(s_8\ s_{10})$ |
| $P_s(n)$, $n=2$ | $(s_1\ s_4)(s_2\ s_5)\ldots(s_7\ s_{10})$ |
| $P_s(n)$, $n=3$ | $(s_1\ s_5)(s_2\ s_6)\ldots(s_6\ s_{10})$ |
| $P_s(n)$, $n=4$ | $(s_1\ s_6)(s_2\ s_7)\ldots(s_5\ s_{10})$ |

FIG. 1

METHOD FOR SPEECH-BASED INFORMATION RETRIEVAL IN MANDARIN CHINESE

FIELD OF THE INVENTION

The present invention relates to a method for information retrieval, and more particularly, to a method for speech-based information retrieval in Mandarin Chinese.

DESCRIPTION OF THE PRIOR ART

Due to the prevalence of the Internet, huge quantities of information are being accumulated very rapidly and made available to users. As a result, the primary obstacle for people to access the information is no longer the spatial or temporal distances, but instead the lack of efficient ways to retrieve the desired information. Information retrieval techniques which provide the users with convenient access to the desired information are therefore extremely attractive. Up to now, most of the work on information retrieval have been focused on approaches using text query to retrieve text information. Substantial efforts and very encouraging results have been reported and practically useful systems have been successfully implemented along this direction. Recently, with the advances in speech recognition technology, proper integration of information retrieval and speech recognition has been considered by many researchers. This includes three different cases: text information retrieval using speech queries, speech information retrieval using text queries, or speech information retrieval using speech queries. All these three cases are referred to as speech-based information retrieval here. This invention described here can offer right solutions to all the three different cases. With the rapidly growing use of audio and multi-media information on the Internet, an exponentially increasing number of voice records such as broadcast radio, television programs, digital libraries and so on, are now being accumulated and made available. On the other hand, the popularity of hand-held devices such as handsets and PDA's, for which keyboards and mice, convenient for PC's, are no longer convenient, have made speech queries much more attractive. Imagine the situation where people can use their hand-held devices to retrieve multi-media information (based on the speech information in it) via speech queries. This is why speech-based information retrieval is becoming more and more important. Of course, sometimes either the user query or the information to be retrieved may be the form of text. For the Chinese language, because the language is not alphabetic and there exists a huge number of commonly used Chinese characters, the input of Chinese characters into computers is a very difficult and unsolved problem even today. As a result, speech-based information retrieval will be much more important and attractive for Mandarin Chinese than for other languages.

Unlike text-based information retrieval, speech-based information retrieval can't be achieved at all by directly matching the input queries with the information records. Not only can the vocabulary, text and topic domains spoken in the voice records and/or the speech queries be completely different, but the differences in acoustic conditions such as speakers, speaking modes and background noises add further complication. Therefore both the queries and the information records, regardless in form of text or speech, must be transcribed into some kind of content features, based on which the relevance between the queries and the information records can then be measured. As a result, accurate recognition of Mandarin speech with a high degree of variability in vocabulary, topic domains and acoustic conditions is certainly the first key issue. Such a high degree of variability apparently makes the desired accurate recognition very difficult, and a substantial percentage of recognition errors will inevitably happen. Such speech recognition errors definitely make the information retrieval techniques considered here significantly different from those used in the conventional text-based information retrieval approaches, and a very high degree of robustness in these retrieval techniques is obviously needed.

The second issue for voice retrieval of Mandarin speech information is to choose appropriate content features to represent both the information records as well as the user queries, so that they can be used in evaluating the relevance measure in the retrieval processes. There can be at least two areas of approaches: the keyword-based and the word-based approaches. For the keyword-based approaches, one can define a set of keywords for the information records in advance, and whenever some keywords are spotted from the user queries, the information records with those or relevant keywords can then be retrieved. This approach is efficient and cost-effective, especially for retrieval of static databases for which the primary search words don't change frequently. However, it is not always easy to define a set of adequate keywords for all the information records to be retrieved even if we know the contents of all of them in advance, which is almost impossible especially when the information records keep on growing very fast on the Internet every day. The out-of-vocabulary problem always exists no matter how large the keyword set is. Such considerations naturally lead to the word-based approaches. Once both the information records and the user queries are fully represented in the form of text (words/characters, some of them may be obtained with speech recognition techniques), many well-developed text retrieval techniques can be directly applied. However, even for such an approach, the out-of-vocabulary problem is still an issue, since a large vocabulary speech recognizer also needs a predefined lexicon, and some special words important for retrieval purposes may be simply outside of this predefined lexicon, which is true for the Chinese language as explained below. This leads to the concept of making a comparison directly on the level of units smaller than a word instead. Because in such approaches these smaller units are not necessarily decoded into words, the retrieval is therefore not limited by a finite lexicon.

SUMMARY OF THE INVENTION

It is therefore a primary objective of the present invention to provide a method for speech-based information retrieval in Mandarin Chinese.

According to the claimed invention, considering the monosyllabic structure of the Chinese language, a whole class of indexing terms for speech-based information retrieval for Mandarin Chinese using syllable-level statistical characteristics was developed. The discriminating capabilities of such syllable-based approaches have been well verified. The information fusion of indexing terms of syllable-, character- and word-levels as well as various special approaches for better retrieval results were also included.

These and other objective and advantages of the present invention will no doubt become obvious to those of ordinary skill in the art after having read the following detailed description of the preferred embodiment that is illustrated in the various figures and drawings.

BRIEF DESCRIPTION OF THE DRAWINGS

FIG. 1 is a diagram of various syllable-level indexing terms for an example syllable sequence $S_1 S_2 S_3 \ldots S_{10}$.

DETAILED DESCRIPTION OF THE PREFERRED EMBODIMENT

Figure 2:
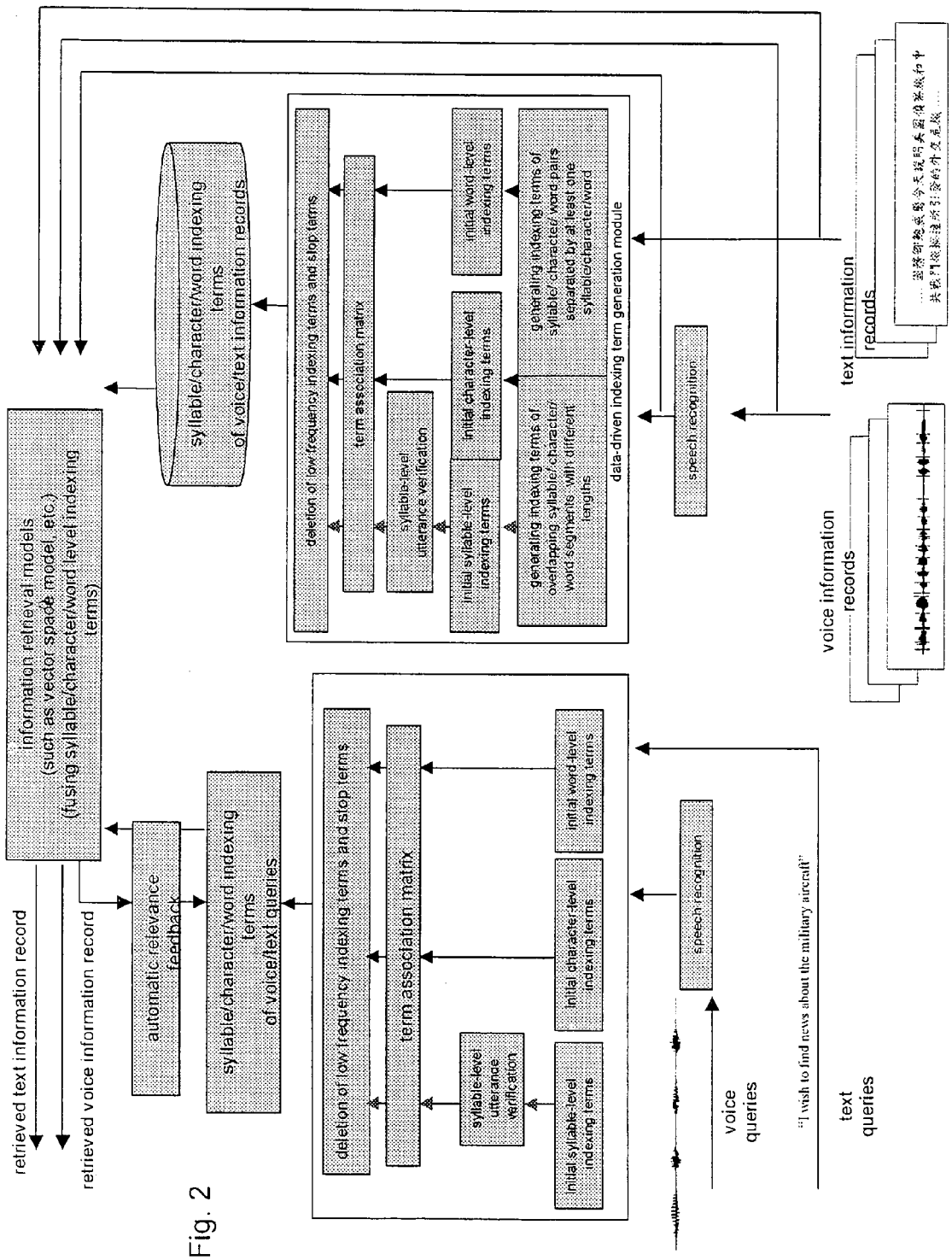
FIG. 2 is a flow chart of an embodiment of the present invention.

I. Considerations of Using Syllable-Level Characteristics for Mandarin Chinese In the Chinese language, because each of the large number of characters (at least 10,000 are commonly used) is pronounced as a monosyllable, and is a morpheme with its own meaning, new words are very easily generated everyday by combining a few characters or syllables. For example, the combination of the characters "電(electricity)" and "腦(brain)" gives a new word "電腦(computer)", and the combination of the characters "股(stock)", "市(market)", "長(long)", and "紅(red)" gives a new word "股市長紅(stock prices remain high for long)" in business news. In many cases the meaning of these words more or less have to do with the meaning of the component characters. Examples of such new words also include many proper nouns such as personal names and organization names which are simply arbitrary combinations of a few characters, as well as many domain specific terms just as the examples mentioned above. Many of these words are very often the right key in information retrieval functions, because they usually carry the core information, or characterize the subject topic. But in many cases these important words for retrieval purposes are simply not included in any lexicon. It is therefore believed that the out-of-vocabulary problem is especially important for Chinese information retrieval, and this is a very important reason why the syllable-level statistical characteristics make great sense in the problem here. In other words, the syllables represent characters with meaning, and in the retrieval processes they do not have to be decoded into words which may not exist in the lexicon.

Actually, the syllable-level information makes great sense for retrieval of Chinese information due to the more general monosyllabic structure of the language. Although there exist more than 10,000 commonly used Chinese characters, a nice feature of the Chinese language is that all Chinese characters are monosyllabic and the total number of phonologically allowed Mandarin syllables is only 1,345. So a syllable is usually shared by many homonym characters with completely different meanings. Each Chinese word is then composed of from one to several characters (or syllables), thus the combination of these 1,345 syllables actually gives an almost unlimited number of Chinese words. In other words, each syllable may stand for many different characters with different meanings, while the combination of several specific syllables very often gives only very few, if not unique, homonym polysyllabic words. As a result, comparing the input query and the documents to be retrieved based on the segments of several syllables may provide a very good measure of relevance between them.

In fact, there exist other important reasons to use syllable-level information. Because almost every Chinese character is a morpheme with its own meaning, they very often play quite independent linguistic roles. As a result, the construction of Chinese words from characters is very often quite flexible. One example of this phenomenon is that in many cases different words describing the same or similar concepts can be constructed by slightly different characters, e.g., both "中華文化(Chinese culture)" and "中國文化(Chinese culture)" means the same, but the second characters used in these two words are different. Another example of this phenomenon is that a longer word can be arbitrarily abbreviated into shorter words, e.g., "國家科學委員會(National Science Council)" can be abbreviated into "國科會", which includes only the first, the third and the last characters. Furthermore, exotic words from foreign languages can very often be translated into different Chinese words based on its pronunciation, e.g., "Kosovo" may be translated into "科索沃/ke1-suo3-wo4/", "柯索佛/ke1-suo3-fo2/", "克索夫/ke1-suo3-fu1/", "科索伏/ke1-suo3-fu2/", "科索 夫/ke1-suo3-fo2/" and so on, but these words usually have some syllables in common, or even exactly the same syllables. Therefore, an intelligent retrieval system needs to be able to handle such wording flexibility, such that when the input queries include some words in one form, the desired audio records can be retrieved even if they include the corresponding words in other different forms. The comparison between the speech queries and the audio records directly at the syllable-level does provide such flexibility to some extent, since the "words" are not necessarily constructed during the retrieving processes, while the different forms of words describing the same or relevant concepts very often do have some syllables in common.

II. Core Technologies

A. Syllable-level Indexing Terms

In this invention a whole class of syllable-level indexing terms were developed, including overlapping syllable segments with length N (S(N), N=1,2,3,4,5, etc.) and syllable pairs separated by n syllables ($P_S(n)$, n=1,2,3,4, etc.). Considering a syllable sequence of 10 syllables $S_1 S_2 S_3 \ldots S_{10}$, examples of the former are listed on the upper half of FIG. 1, while examples of the latter on the lower half of FIG. 1. For example, overlapping syllable segments of length 3 (S(N), N=3) include such segments as ($S_1 S_2 S_3$), ($S_2 S_3 S_4$), ($S_3 S_4 S_5$), etc., while syllable pairs separated by 1 syllable ($P_S(n)$, n=1) include such pairs as ($S_1 S_3$), ($S_2 S_4$), ($S_3 S_5$), etc. Considering the structural features of the Chinese language, combinations of these indexing terms make good sense for retrieval purposes. For example, as mentioned previously, each syllable represents some characters with meaning, and very often words with similar or relevant concepts have some syllables in common, even if some of such words are out-of-vocabulary. Therefore syllable segments with length 1 (S(N), N=1) (non-overlapping monosyllables in this case) make sense in retrieval. However, because each syllable is also shared by many homonym characters each with a different meaning, syllable segments with length 1 (S(N), N=1) alone definitely cause serious ambiguity. Therefore they have to be combined with other indexing terms. In fact, in the Chinese language, about 91% of the top 5,000 most frequently used polysyllabic words are bi-syllabic, i.e., they are pronounced as a segment of two syllables. Therefore, the syllable segments with length 2 (S(N), N=2) definitely carry a plurality of linguistic information, and make great sense to be used as important indexing terms. Similarly, if longer syllable segments such as S(N), N=3, are matched between an information record and the query, very often very important information for retrieval may be captured in this way. On the other hand, because of the very flexible wording structure in the Chinese language as described previously, syllable pairs separated by n syllables are helpful in retrieval. Considering the example mentioned previously in Section II, the word "國家科學委員會(National Science Council)" may be abbreviated as "國科會" including only the first, third and the last characters. Syllable pairs separated by n syllables become apparently useful in such cases. Furthermore, because substitution, insertion and deletion errors always happen during the syllable recognition process, such indexing terms as syllable pairs separated by n syllables are also helpful in handling such syllable recognition errors. In summary, the monosyllables in Chinese represent characters carrying some meanings and concepts and may somehow take care of the out-of-vocabulary problem. The ambiguity caused by homonym characters sharing the same monosyllable may then be clarified by overlapping syllable segments with length N, N>1, and syllable pairs separated by n syllables. The former may capture the information of polysyllabic words or pleases which are important for retrieval, and the latter may handle to some extent the problems arising from the flexible wording structure in the Chinese language such as the abbreviation problem as well as those problems due to speech recognition errors including substitutions, insertions and deletions. With the above definition of indexing terms, each utterance of the speech queries or records can be first recognized into a syllable lattice. In this syllable lattice, each utterance segment which may be a syllable can have several syllable candidates. For a certain syllable candidate of the utterance segment, the acoustic recognition score can be obtained during the speech recognition process. The acoustic recognition score of a specific indexing term, as mentioned above, is then simply the average of the acoustic recognition scores for all syllables involved in the specific indexing term. If either the query or the information records are in the form of text, then the above recognition scores are replaced by frequency counts for the syllable-level indexing terms, and all others remain the same.

With the indexing terms as defined above and the way the speech query/record are represented by these indexing terms, all the various information retrieval models currently used for text-based information retrieval can be equally used for speech-based information retrieval. The vector space model widely used in many text information retrieval systems is simply one example. In this model, each information record and each query, regardless of in the form of text or speech, is represented by a set of feature vectors, each consisting of information regarding one type of indexing terms. As one example, nine types of indexing terms (S(N), N=1~5, and $P_s(n)$, n=1~4) can be used to construct nine feature vectors for each information record and each query. The relevance measure between an information record and a query can then be evaluated based on these nine feature vectors, just as in the normal text-based information retrieval process.

B. Fusion of Syllable-, Character- and Word-Level Information

Although the syllable-based indexing features mentioned above have been shown to provide very strong discriminating capabilities in speech-based information retrieval for Mandarin Chinese, the character- and word-level information does bring extra knowledge which does not exist in the syllable-level information. For example, the ambiguities caused by different homonym characters sharing the same syllable can be clarified by the characters, and the words carry much more semantic information than the syllables. But the character- or word-level information may carry more recognition errors, especially for out-of-vocabulary words. It is therefore believed that a proper fusion of syllable-, character- and word-level information would be helpful for speech-based information retrieval for Mandarin Chinese. Just as the syllable-level indexing terms, similar character- and word-level indexing terms can be constructed, for example, the overlapping character/word segments with length N (C(N), N=1,2,3,4,5,etc., and W(N), N=1,2,3,4,5, etc.), and the character/word pairs separated by n characters/words ($P_C(N)$, N=1,2,3,4, etc., and $P_W(N)$, N=1,2,3,4, etc.). In this way, the relevance measure between the query and document is simply the weighted sum of the relevance scores for the syllable-, character- and word-level indexing terms, each evaluated by a set of feature vectors, respectively, as in the above.

C. Data-Driven Indexing Terms

As described previously, the indexing terms based on overlapping syllable, character and word segments with length N (S(N), N=1,2,3,4,5, etc.) can offer very good performance in speech-based information retrieval for Mandarin Chinese. However, in this way the total number of such overlapping segments to be used for indexing would become prohibitively large and thus inevitably make the computation and memory requirements very difficult for real-world applications. In order to solve this problem, in this invention a statistical approach to select those syllable, character and word segments carrying more semantic information, but discard those calling less, based on some statistical analysis on the information records to be retrieved (or a record database), was developed. Take the syllable- or character-level indexing terms for example. The complete syllable or character segment "柬埔寨/jian3-pu3-zhai4/(Cambodia)" (S(N) or C(N), N=3)" will be selected as an indexing term because it is the name of a country, while the syllable or character segments "柬埔/jian3-pu3/" and "埔寨/pu3-zhai4/" (S(N) or C(N), N=2) will be discarded because they do not mean anything semantically. Similar concept applies to words. For example, the segment of two words "陳水扁總統(President Cheni Shui-Bian)", which is composed of two connected words "陳水扁(Chen Shui-Bian)" and "總統(president)" and carries some complete semantic information, therefore will be selected as an indexing term. On the other hand, the segment of two words "總統今天(president today)", which is composed of a word "總統(president)" and a word "今天(today)", does not carry complete semantic information and therefore should be discarded. Such a data-driven approach not only can reduce the size of indexing terms to a very compact number, but also can improve the retrieval performance significantly. Such data-driven indexing terms can be selected in a bottom-up procedure as described below. Taking syllable-level indexing terms as an example, starting with an indexing term set consisting of all single syllables only as the initial syllable segments, we can concatenate any two syllable segments that appear adjacently in the set of information records (of a record database) into a new larger one, if they satisfy some statistical criteria, and then repeat this process in an iterative procedure. The criteria for such concatenation of syllable segments can be based on some measures, for example the mutual information, the language model parameter, etc., and the threshold for selection of indexing terms can be different for syllable segments with different lengths. Similar procedure applies to generating data-driven character or word segments as indexing terms.

D. Syllable-level Utterance Verification

When the number of syllable candidates for each utterance segment which may include a syllable (or the depth of the syllable lattices) is increased from 1 to m, the number of syllable segments S(N) and syllable pairs separated by n syllables is increased from 1 to $m^N$ and $m^2$ respectively. Although one of them may be exactly correct and provide the right information, the other $m^N-1$ or $m^2-1$ indexing terms all carry one or more wrong syllables, and therefore are noisy terms and inevitably cause interferences in the retrieval processes. Syllable-level utterance verification technique can then be used here. The basic idea is that any occurrence of the indexing terms with an acoustic confidence measure below a pre-assigned threshold is simply deleted. This threshold can be different when constructing different types of indexing features.

E. Deletion of Low Frequency Indexing Terms

It is assumed that the statistical characteristics of syllables in the other existing text corpus were similar to that of the information record collection to be retrieved, and low frequency indexing terms very often include some wrong syllables, which can thus be deleted. Therefore, the statistical distributions of the indexing terms used here, for example S(N), N=1~5, and $P_s(n)$, n=1~4, in some other existing text corpus can be calculated as the reference for pruning. Taking the indexing terms S(N), N=2, for example, an specific indexing term composed of the segment of two syllables ($s_k$, $s_1$) can be deleted if the ratio of the frequency counts of the segment ($s_k$, $s_1$) to the total of frequency counts of all possible segment of two syllables in the other existing text corpus is less than a pre-assigned value $r_o$. The pruning threshold $r_o$ can be different for different types of indexing terms.

F. Stop Terms

For all types of the syllable-, character- and word-based indexing terms developed here, a stop term list can be constructed for the indexing terms used here based on the IDF scores or other similar measures often used in text-based information retrieval. For each type of indexing terms, say S(N), N=1~5, and $P_s(n)$, n=1~4, for syllable-level terms, the M most frequently occurring indexing terms (for example, with the lowest IDF scores) can be taken as the stop terms and removed from the indexing representations. These pre-assigned numbers of M for the stop terms can be different for different types of indexing terms.

G. Blind Relevance Feedback

It has been found that some indexing terms not appearing in the query may still act as useful cues for relevance judgments. For example, the information from the relevant or irrelevant records selected or deleted in the first stage retrieval can be further used to identify the indexing terms relevant to the user's intention. For example, a blind relevance feedback procedure can be used to reformulate the initial query expression automatically by somehow adding some indexing terms appearing in the records retrieved in the first stage retrieval, and deleting some indexing terms appearing in the records not retrieved in the first stage retrieval, etc., to obtain a new query expression.

H. Term Association Matrix

The indexing terms co-occurring frequently within the same records or the same short passages of records very often jointly describe some specific events, areas or topics, and thus may have some degree of synonymity association. Based on this assumption, the database of records to be retrieved can be used to construct a term association matrix for each type of the indexing terms, in which each entry a(m,n) of the matrix is somehow obtained with statistical approaches by counting the frequencies that two indexing terms $t_m$ and $t_n$ co-occurring in the same records or the same short passages of records, as well as individually occurring in all records or all short passages of records, therefore stands for some kind of association between these two specific indexing terms $t_m$ and $t_n$. For example, a(m,n) may be equal to 1 if $t_m$ and $t_n$ always appear in the same passage, and a(m,n) may be equal to zero if $t_m$ and $t_n$ never appear in the same passage, etc. The query feature vector is then reformulated by including in the new query expression a limited number L of extra indexing terms which have the highest synonymity association to those non-zero indexing terms existing in the original query expression. The number L can again be different for different types of indexing terms, etc.

Flow Chart of Embodiment

Please refer to FIG. 2. FIG. 2 is a flow chart of an embodiment of the present invention. Overlapping syllable/character/word segments with length N, syllable/character/word pairs separated by n syllables/characters/words, data-driven indexing terms, syllable-level utterance verification, term association matrix, deletion of low frequency indexing terms and deletion of stop terms, fusion of syllable-, character- and word-level information, and automatic relevance feedback are intergrated to perform speech-based information retrieval in Mandarin Chinese of the present invention.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for speech-based information retrieval in Mandarin Chinese, comprising:
   entering voice or text queries describing information to be requested; determining the indexing terms; and
   using the indexing terms to retrieve the information records requested in a format of voice or text type,
   wherein the indexing terms are syllable pairs separated by at least one syllable.

2. A method for speech-based information retrieval in Mandarin Chinese, comprising:
   entering voice or text queries describing information to be requested;
   determining the indexing terms; and
   using the indexing terms to retrieve the information records requested in a format of voice or text type,
   wherein the indexing terms are overlapping syllable segments with a specific length, and the specific length can be assigned arbitrarily and is at least one.

3. The method for speech-based information retrieval in Mandarin Chinese of claim 2 wherein the specific length is two.

4. The method for speech-based information retrieval in Mandarin Chinese of claim 2 wherein the specific length is three.

5. The method for speech-based information retrieval in Mandarin Chinese of claim 2 wherein the indexing terms also can be overlapping character segments with a specific length, and the specific length can be assigned arbitrarily and is at least one.

6. The method for speech-based information retrieval in Mandarin Chinese of claim 4 wherein the indexing terms also can be character pairs separated by at least one character.

7. The method for speech-based information retrieval in Mandarin Chinese of claim 4 wherein the indexing terms also can be word pairs separated by at least one word.

8. The method for speech-based information retrieval in Mandarin Chinese of claim 2 wherein the indexing terms also can be overlapping word segments with a specific length, and the specific length can be assigned arbitrarily and is at least one.

9. The method for speech-based information retrieval in Mandarin Chinese of claims 2, 5, 8, 1, 6, or 7 wherein the selected indexing terms can be of more than one type.

10. The method for speech-based information retrieval in Mandarin Chinese of claims 2, 5, 8, 1, 6, or 7 wherein the indexing terms can be one or more types selected from a group comprising overlapping syllable segments, syllable pairs, overlapping character segments, overlapping word segments, character pairs, and word pairs.

11. The method for speech-based information retrieval in Mandarin Chinese of claim 2, 5, 8, 1, 6, or 7 wherein after determining indexing terms, the method for speech-based information retrieval in Mandarin Chinese further comprises:
identifying voice utterances for each syllable, character, or word in the voice queries to generate at least one syllable, character, or word candidate to create corresponding syllable-, character-, or word-lattices; and
identifying voice utterances for each syllable, character, or word in the voice information records to generate at least one syllable, character, or word candidate to create corresponding syllable-, character-, or word-lattices;
each syllable, characier, or word candidate of the syllable-, character-, or word-lattices mentioned above comprises a voice recognition score generated by the voice recognition process.

12. The method for speech-based information retrieval in Mandarin Chinese of claim 11 wherein each of the indexing terms further comprises a score, and the score is obtained from averaging the voice recognition scores of all syllable, character, or word candidates involved in the indexing terms.

13. The method for speech-based information retrieval in Mandarin Chinese of claim 12 wherein if the frequency count of the indexing term in a database is smaller than a predetermined value, the syllable, character, or word candidate will be deleted.

14. The method for speech-based information retrieval in Mandarin Chinese of claim 13 wherein the predetermined value can be set while determining the indexing terms, and different values can be set for different indexing terms.

15. The method for speech-based information retrieval in Mandarin Chinese of claim 11 wherein if the voice recognition score of each syllable, character, or word candidate is smaller than a predetermined value, the syllable, character, or word candidate will be deleted.

16. The method for speech-based information retrieval in Mandarin Chinese of claim 11 further comprising a second retrieval after the first step of using the indexing terms to retrieve voice- or text-type information records to be requested.

17. The method for speech-based information retrieval in Mandarin Chinese of claim 16 wherein the second retrieval is performed by adding indexing terms or removing indexing terms or modifying their scores to generate new feature vectors of the queries.

18. The method for speech-based information retrieval in Mandarin Chinese of claim 17 wherein the indexing terms to be added, removed or scores modified can be determined by identifying the indexing terms in the feature vectors for the relevant and irrelevant information records obtained in the previous retrieval.

19. The method for speech-based information retrieval in Mandarin Chinese of claim 18 wherein the indexing terms are added or their scores are increased if the indexing terms often appear in the relevant information records obtained in the previous retrieval.

20. The method for speech-based information retrieval in Mandarin Chinese of claim 18 wherein the indexing terms are removed or their scores are decreased if the indexing terms often appear in the irrelevant information records obtained in the previous retrieval.

21. The method for speech-based information retrieval in Mandarin Chinese of claims 2, 5, 8, 1, 6, or 7 wherein speech-based information retrieval in Mandarin Chinese comprises using voice query to retrieve text information records, using text query to retrieve voice information records, and using voice query to retrieve voice information records.

22. The method for speech-based information retrieval in Mandarin Chinese of claim 21 wherein the scores of the indexing terms are frequency counts for the indexing terms in the text-type queries or information records if the queries or information records are text-type.

23. The method for speech-based information retrieval in Mandarin Chinese of claims 2, 5, 8, 1, 6, or 7 further comprising designing a set of feature vectors for each query and each information record, wherein each feature vector comprises a plurality of components, and each component is used to represent the scores obtained from the voice recognition process (if in voice-type) or frequency counts (if in text-type) for each indexing term for the queries and information records.

24. The method for speech-based information retrieval in Mandarin Chinese of claim 23 wherein a relationship between the queries and each information record is determined by weighted sum of respective matching results for each pair of corresponding feature vectors representing the query and the information record.

25. The method for speech-based information retrieval in Mandarin Chinese of claim 23 further comprising a second retrieval after the first step of using the indexing terms to retrieve voice- or text-type information records to be requested.

26. The method for speech-based information retrieval in Mandarin Chinese of claim 25 wherein the second retrieval is performed by adding indexing terms or removing indexing terms or modifying their scores to generate new feature vectors of the queries.

27. The method for speech-based information retrieval in Mandarin Chinese of claim 26 wherein the indexing terms to be added, removed or scores modified can be determined by identifying the indexing terms in the feature vectors for the relevant and irrelevant information records obtained in the previous retrieval.

28. The method for speech-based information retrieval in Mandarin Chinese of claim 27 wherein the indexing terms are added or their scores are increased if the indexing terms often appear in the relevant information records obtained in the previous retrieval.

29. The method for speech-based information retrieval in Mandarin Chinese of claim 27 wherein the indexing terms are removed or their scores are decreased if the indexing terms often appear in the irrelevant information records obtained in the previous retrieval.

30. The method for speech-based information retrieval in Mandarin Chinese of claims 2, 5, 8, 1, 6, or 7 further comprising generating a set of data-driven indexing terms, the generation process for the set of indexing terms can start from a set consisting of all single syllables, characters, or words only in a bottom-up procedure, any two syllable, character, or word segments which appear adjacently iteratively concatenated into a new larger syllable, character, or word segment, if they satisfy some statistical criteria.

31. The method for speech-based information retrieval in Mandarin Chinese of claim 30 wherein the length of the other larger syllable, character, or word segment is two.

32. The method for speech-based information retrieval in Mandarin Chinese of claim 30 wherein the length of the other larger syllable, character, or word segment is three.

33. The method for speech-based information retrieval in Mandarin Chinese of claim 30 wherein the statistical criteria can be mutual information between the two smaller syllable, character, or word segments which appear adjacently and can be concatenated into another larger syllable, character, or word segment.

34. The method for speech-based information retrieval in Mandarin Chinese of claim 30 wherein the statistical criteria can be some language model parameters between the two smaller syllable, character, or word segments which appear adjacently and can be concatenated into another larger syllable, character, or word segment.

35. The method for speech-based information retrieval in Mandarin Chinese of claim 30 wherein in the step of generating the data-driven indexing terms, when determining whether to combine two adjacent smaller syllable, character, or word segments into a larger syllable, character, or word segment to be new indexing terms, different thresholds are given to the indexing terms of syllable, character, or word segments with different lengths; when the statistical criteria is larger than the threshold, the two smaller syllable, character, or word segments are combined into a new indexing term.

36. The method for speech-based information retrieval in Mandarin Chinese of claim 35 wherein the step of generating the data-driven indexing terms can be performed repeatedly until no statistical criteria of any adjacent syllable, character, or word segments is larger than the threshold.

37. The method for speech-based information retrieval in Mandarin Chinese of claims 2, 5, 8, 1, 6, or 7 further comprising creating a list of stop terms according to an inverse document frequency of each indexing term.

38. The method for speech-based information retrieval in Mandarin Chinese of claim 37 further comprising deleting the most frequently occurring indexing terms in the list of stop terms from the feature vectors.

39. The method for speech-based information retrieval in Mandarin Chinese of claims 2, 5, 8, 1, 6, or 7 further comprising creating a term association matrix for the set of indexing terms, the matrix comprising a plurality of matrix elements, each matrix element representing the statistical characteristics for any two indexing terms co-occurring in the same information records.

40. The method for speech-based information retrieval in Mandarin Chinese of claim 39 wherein the matrix elements can be a value between 0 and 1.

41. The method for speech-based information retrieval in Mandarin Chinese of claim 40 wherein the elements equal to 0 may represent two indexing terms never co-occurring in the same information records, or without synonymity association.

42. The method for speech-based information retrieval in Mandarin Chinese of claim 40 wherein the elements equal to 1 may represent two indexing terms always co-occurring in the same information records or with high synonymity association.

43. The method for speech-based information retrieval in Mandarin Chinese of claim 42 further comprising adding the several indexing terms with the highest synonymity association with the indexing terms in the existing feature vectors of the queries to form new feature vectors of the queries.

44. The method for speech-based information retrieval in Mandarin Chinese of claim 2, 5, 8, 1, 6, or 7 further comprising a second retrieval after the first step of using the indexing terms to retrieve voice- or text-type information records to be requested.

45. The method for speech-based information retrieval in Mandarin Chinese of claim 44 wherein the second retrieval is performed by adding indexing terms or removing indexing terms or modifying their scores to generate new feature vectors of the queries.

46. The method for speech-based information retrieval in Mandarin Chinese of claim 45 wherein the indexing terms to be added, removed or scores modified can be determined by identifying the indexing terms in the feature vectors for the relevant and irrelevant information records obtained in the previous retrieval.

47. The method for speech-based information retrieval in Mandarin Chinese of claim 46 wherein the indexing terms are added or their scores are increased if the indexing terms often appear in the relevant information records obtained in the previous retrieval.

48. The method for speech-based information retrieval in Mandarin Chinese of claim 46 wherein the indexing terms are removed or their scores are decreased if the indexing terms often appear in the irrelevant information records obtained in the previous retrieval.

* * * * *